United States Patent [19]

Gray

[11] Patent Number: 4,486,468
[45] Date of Patent: Dec. 4, 1984

[54] FIRE RETARDANT FOAM

[75] Inventor: Stanley D. Gray, Greensboro, N.C.

[73] Assignee: Anti-Fire-Foam, Inc., Atlanta, Ga.

[21] Appl. No.: 412,441

[22] Filed: Aug. 27, 1982

[51] Int. Cl.³ ............................ B05D 3/12; B05D 5/00
[52] U.S. Cl. .................................... 427/181; 427/180;
427/242; 427/299; 427/434.4; 428/921;
521/906
[58] Field of Search ............... 427/180, 181, 244, 299,
427/434.4; 521/906

[56] References Cited

U.S. PATENT DOCUMENTS

| | | | |
|---|---|---|---|
| 2,200,850 | 5/1940 | Miserentino | 427/244 |
| 4,073,979 | 2/1978 | Pettingell | 427/244 |
| 4,223,066 | 9/1980 | Boyle | 427/180 X |
| 4,224,374 | 9/1980 | Priest | 521/906 X |
| 4,247,971 | 2/1981 | Maruta et al. | 427/247 X |
| 4,305,976 | 12/1981 | Zubiate et al. | 427/180 X |
| 4,342,798 | 8/1982 | Illger et al. | 427/244 |

Primary Examiner—Shrive P. Beck
Attorney, Agent, or Firm—Patrick F. Henry

[57] ABSTRACT

Fire retardant polyurethane foam materials and methods of producing the same are disclosed. Such foams are produced by encapsulating or depositing fire retardant materials within the cell structure of previously formed foam materials. In one embodiment, the foam is passed through a liquid medium containing fire retardant materials, with the foam being subjected to periodic compression during contact with the liquid medium. In an alternative embodiment, the foam is subjected to a dust or particulate atmosphere in which fire retardant material is the particulate material.

2 Claims, 3 Drawing Figures

FIRE RETARDANT FOAM

BACKGROUND AND SUMMARY OF THE INVENTION

The present invention relates to fire retardant foam materials. More particularly, the present invention relates to fire retardant polyurethane flexible foam materials and methods of producing the same, whereby fire retardant materials are deposited in the cell structure of the foam to inhibit propagation of flame throughout the foam mass.

Previous methods for producing fire retardant polyurethane flexible and semi-flexible foams have included incorporating into the formulation, prior to the foam reaction taking place, a variety of ingredients such as halogenated phosphorus compounds and, more recently, alumina trihydrate to obtain flame spread values as required by various tests. Thus, for example, automotive tests require only small amounts of additives and the foams exhibit a low degree of fire retardancy. While such treated foam may self-extinguish itself when exposed to a flame while in the horizontal position, the specimen may nevertheless burn readily if placed in a vertical position.

Some agencies have more stringent test parameters which require that the specimen be tested in the vertical position. To meet such parameters, higher loadings of fire retardants are necessary in the formulation, reducing some physical properties of the foam and significantly increasing foam density.

In some instances, foams utilized in the manufacture of furnishings for public places must pass a "Radiant Panel Test", also known as ASTME-162-79. This test requires the foam to be tested at a 45 degree angle while placed in a chamber at elevated temperature. In order to pass such a test, it has been necessary in one case to use a mixture of additives which increases the density of the foam from 1.3 lbs. per cubic foot to 4 lbs. per cubic foot.

An important consideration related to fire retardancy in urethanes is the migrating phenomenon of the additives. Also, there is evidence to indicate that some foams may lose their fire retardancy upon aging.

In U.S. Pat. Nos. 3,717,597 and 3,730,917 there are described various methods of obtaining a degree of fire retardancy. Both of these prior art patents are concerned with the use of regenerated scrap foam, i.e. scrap foam which is chopped into pieces and then glued together to form a usable piece. In U.S. Pat. No. 3,717,597, the method described therein employs urea to obtain a degree of fire retardancy.

The present invention deals with the use of virgin foam rather than foam of the rebonded type. The prior art patents are concerned with a composite (regenerated foam). Also, the prior art patents are concerned with mixing the urea with the foam particulate in a vat and adding adhesive. In the present invention, on the other hand, solid particulate material is deposited inside the cells of the foam, and such solid particulate material acts as a fire retardant.

By the present invention, there are provided fire retardant foam materials and methods of producing fire retardant polyurethane foams derived from polyethers and polyesters, with such foams having highly fire retardant properties which are imparted to the foam after it is produced. The present method includes depositing and encapsulating within the previously manufactured polyurethane foam cell structure, which may be either flexible or semi-flexible, certain materials or compounds which function as flameproofing or fire retardant agents, inhibiting propagation of the flame throughout the foam mass. The terms "flameproofing" and "fire retardant" are used interchangeably throughout the present specification and claims.

In one embodiment, the invention includes passing previously formed foam material in a compressed condition through a solution or dispersion of a fire retardant compound in a liquid medium, followed by allowing the foam material to dry, with the fire retardant material being retained within the cellular structure of the foam. Fire retardant compounds or materials which have been found to be useful in this embodiment of the invention include, ammonium sulfate, sodium bicarbonate and urea, with each of such materials being employed in the form of a solution or dispersion in water.

In variation of this embodiment, a small amount, less than 10% by weight, or a casein based glue or adhesive composition is added to stimulate adhesion of the solid particles within the foam cell structure.

An alternative embodiment of the invention is a dry process in which the foam material is subjected to one or more compressions in the presence of a dust atmosphere wherein the dust particles are of the desired fire retardant material. The foam material absorbs and retains the dust particles within the cell structure of the foam. Fire retardant compounds or materials which have been found to be useful in this embodiment include urea, ammonium, sulfate and sodium bicarbonate.

DESCRIPTION OF THE PREFERRED EMBODIMENTS

Figure 1:
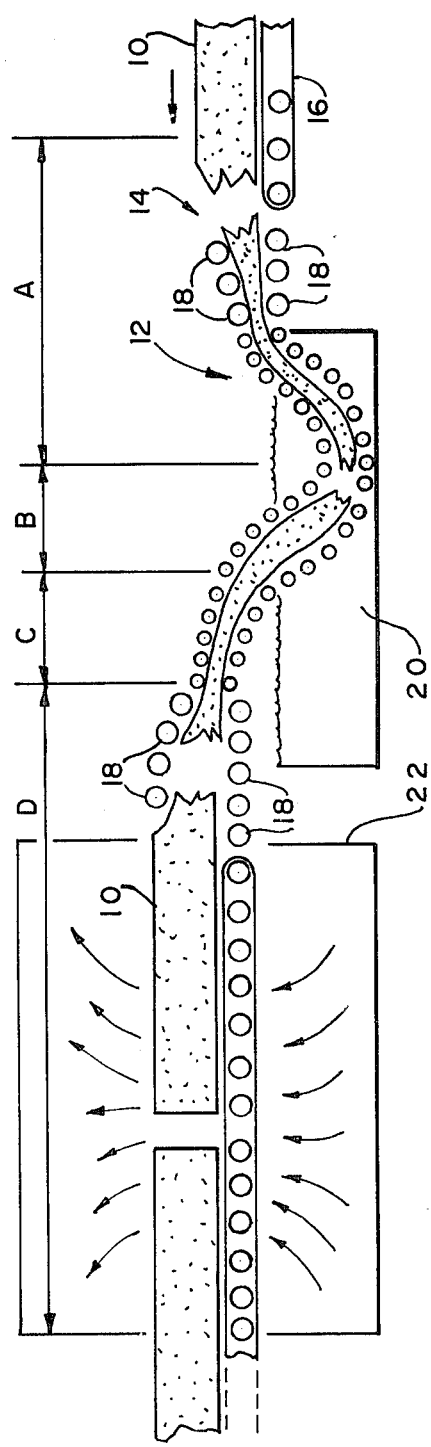
FIG. 1 is a side elevation of a schematic representation showing one method for producing fire retardant foam materials in accordance with the present invention.

In the embodiment of the invention as shown in FIG. 1, there is provided a fire retardant foam material obtained by passing the previously formed foam material through a liquid medium containing a fire retardant agent. To obtain the desired product, a foam material 10 in sheet form is passed from right to left through a roller construction 12 containing two rows 14, 16 of horizontally aligned rollers 18 which are provided with suitable means (not shown) of conventional construction for compressing the foam 10 between the rows 14, 16 at intervals along the length thereof.

During stage A, as shown, the foam 10 is compressed by the rows 14, 16 of rollers 18. When the foam 10 reaches stage B, the rollers 18 release compression on the foam, allowing the cells of the foam structure to absorb the liquid medium 20 containing fire retardant material. As the foam enters stage C, the rollers 18 compress the foam 10 again, releasing most of the liquid that had been absorbed. The foam 10 then enters stage D which is the drying portion of the process, provided by a heat convection oven 22 maintained at a suitable temperature such as about 250° F. As the foam 10 exits in a dry condition, the density increases due to the fire retardant material which has been absorbed within the cell structure of the foam 10.

The method as shown in FIG. 1 yields a foam of very high fire retardant properties. Depending upon the properties desired, various parameters may be varied, including the concentration of fire retardant material in the liquid, the compression effect of the rollers 18 and the density of the foam 10.

In a specific example of the invention as carried out by the method of FIG. 1, a sample of urethane flexible foam having a density of 1.3 pounds per cubic foot was passed through an aqueous solution containing 30% by weight of dissolved ammonium sulfate crystals. As the foam exited from the drying stage D, the foam density had increased to approximately 2.7 pounds per cubic foot. The ammonium sulfate crystals formed within the cell structure of the foam 10 were found to be larger than the individual cells, so that the cell walls prevented the crystals from exiting the foam mass.

The amount of fire retardant particles in the solution or dispersion, and also the amounts deposited in the foam, will depend on the final properties desired. For example, a 20% by weight solution of ammonium sulfate in water, depositing 250 grams per cubic foot of foam, on a non-fire retardant grade foam is sufficient to obtain a degree of fire retardancy that will meet the requirements of the New York Port Authority Code. A binding agent, of conventional type, may be added to the solution or dispersion if desired.

Figure 3:
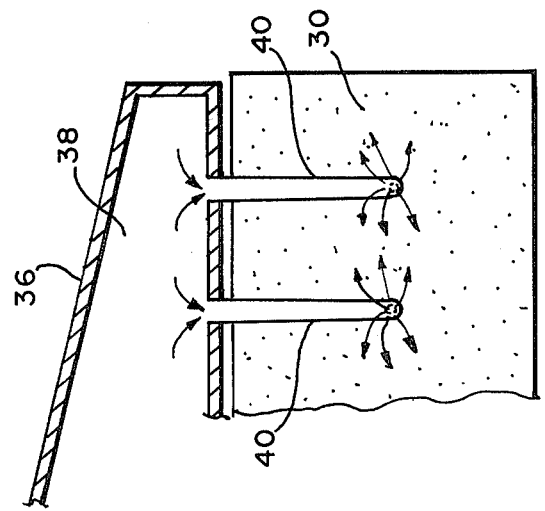
FIG. 3 is an enlarged view of the right upper corner portion of the board shown in the schematic representation of FIG. 2.
Figure 2:
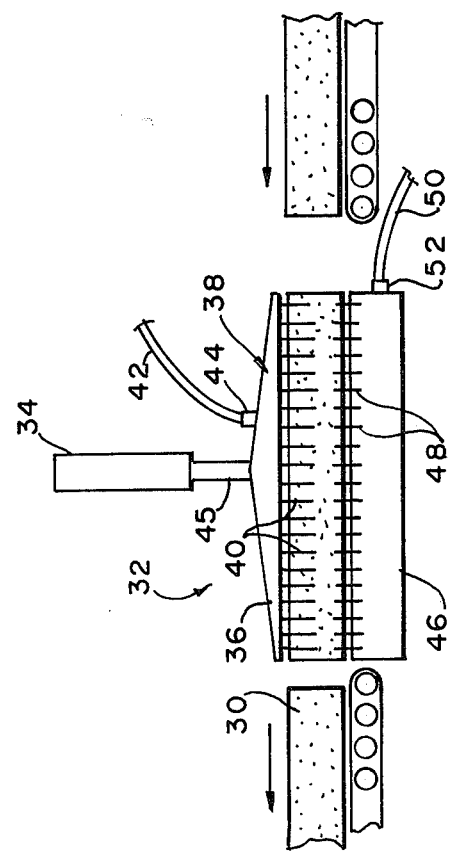
FIG. 2 is a side elevation of a schematic representation showing a second method for producing fire retardant foam materials in accordance with the present invention.

In FIGS. 2 and 3 there is shown an embodiment of the invention in which a fire retardant foam material is obtained by subjecting the foam to a dust or particulate atmosphere containing fire retardant materials as the particulate matter. To obtain the desired product, a foam material 30 in sheet form is passed from right to left into a press assembly 32 which includes a vertical air piston and cylinder 34 connected to a board member 36 having a hollow interior portion 38 with a plurality of tubular needles 40 extending downwardly in parallel relation from the board 36. The needles 40 are located in a horizontal lower surface of board member 36. The interior of each of the needles 40 is in fluid communication with interior portion 38. A source of fire retardant material in dust form is connected to interior portion 38 through conduit 42 having valve control 44.

Located directly below board member 36 and spaced therefrom is a chamber 46 having a plurality of upwardly extending tubular needles 48, the interior of each of which is in fluid communication with chamber 46. The needles 48 are located in a horizontal upper surface of chamber 46. A source of air under pressure is connected to the interior of the chamber 46 through conduit 50 having valve control 52. The position of chamber 46 relative to board member 36 should be such as to allow smooth passage of a sheet of foam between members 36 and 46.

During operation, piston 45 is activated in a conventional manner to lower the board member 36, compressing the foam 30 and allowing needles 40 and 48 to enter the foam 30. Pressure is then released and air is passed through needles 48 into the foam 30, thus expanding the foam. Next a fire retardant material is passed under pressure through needles 40 into the foam 30. The foam 30 is then released from the needles 40, 48 by suitable mechanical means and the operation is completed with the fire retardant agent having been introduced into the foam 30.

In a specific example of the invention as carried out by the method of FIGS. 2 and 3, a sample of polyurethane foam 30 was treated with pulverized ammonium sulfate. Upon completion of the procedure as described above, the foam 30 may be coated with a flexible coating of a rubberized material or other similar material to prevent dust from exiting the foam mass.

In the practice of this invention according to any of the above described embodiments, the quantities and types of materials to be employed will vary depending on the properties desired. Furthermore, it is to be expected that some degree of synergism will be encountered when combinations of fire retardant materials are utilized or when one of the materials is utilized in combination with a standard fire retardant agent previously incorporated into the foam. Furthermore, it has been found that some compounds do not work well in the present invention. For example, alumina trihydrate, a fire retardant that is incorporated into the foam during the formulation stage, as described in the prior art, does not produce desirable results when encapsulated within the foam cells in accordance with the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of producing fire retardant foam material from already produced felxible foam which includes:
    contacting said foam material with a dust or dry particulate atmosphere in which a fire retardant material selected from the group consisting of urea, sodium bicarbonate and ammonium sulfate is the particulate material;
    compressing the foam material while said foam material is in contact with said particulate atmosphere;
    releasing the compression on the foam so as to allow particulate material to be absorbed within the cell structure of the foam material;
    injecting fire retardant material into the interior of the foam material through a plurality of hollow needles; and
    passing air into the foam to expand the foam prior to injection of the fire retardant material.

2. The method of claim 1 wherein the air is passed into the foam through a plurality of hollow needles injected into the foam.

* * * * *